June 1, 1954 W. M. PULVER 2,680,000
HOSE CLAMP
Filed May 31, 1950 2 Sheets-Sheet 1
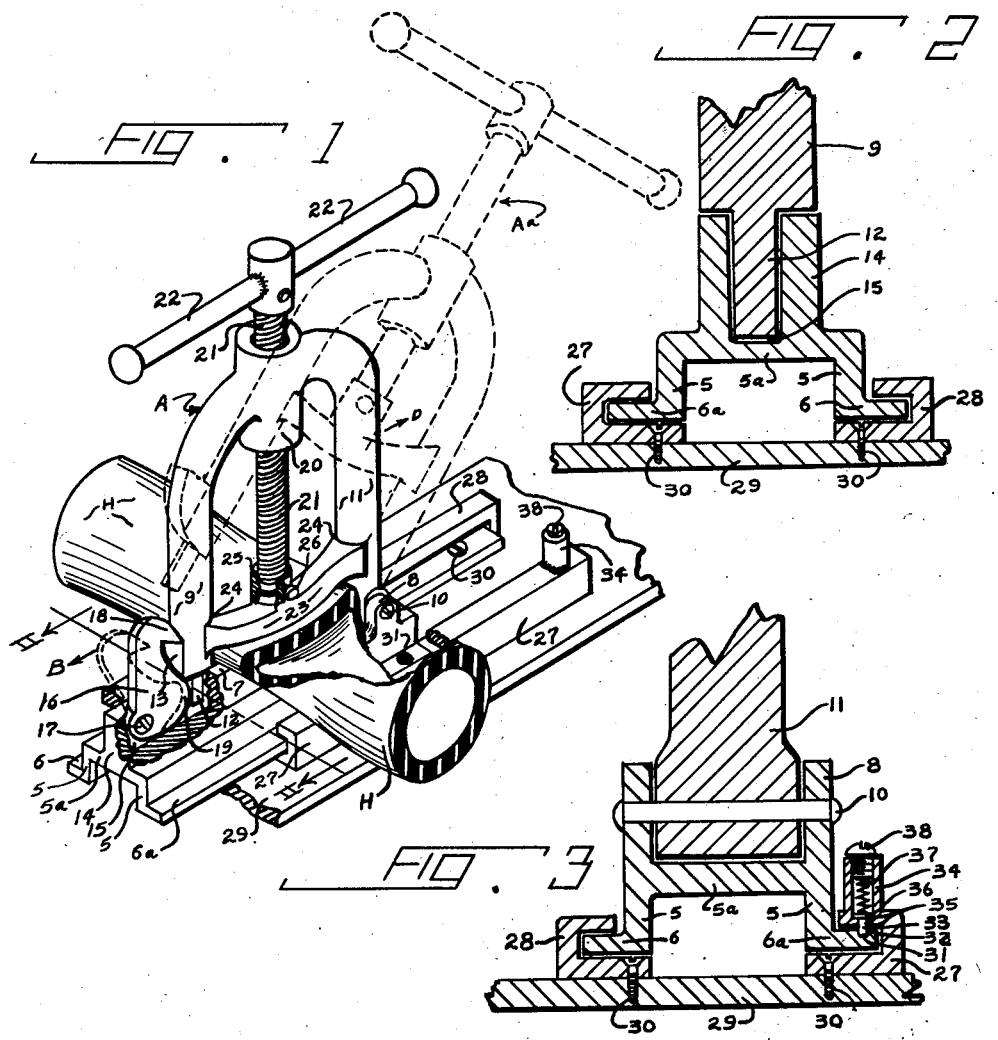
INVENTOR.
Walter M. Pulver,
BY M. Y. Charles
ATTORNEY.

June 1, 1954 W. M. PULVER 2,680,000
HOSE CLAMP
Filed May 31, 1950 2 Sheets-Sheet 2

Walter M. Pulver,
INVENTOR.

BY M. Y. Charles
ATTORNEY

UNITED STATES PATENT OFFICE 2,680,000

HOSE CLAMP

Walter M. Pulver, Wichita, Kans.

Application May 31, 1950, Serial No. 165,176

2 Claims. (Cl. 251—8)

This invention relates to an improvement in hose clamps. An object of this invention is to provide a clamp device that may be placed around a fire hose while the hose has water under pressure therein and by closing the clamp the hose may be mashed together to stop the flow of water therethrough to allow the firemen to change hose nozzles, add additional hose lengths to the hose line, add branch lines to a hose feed line, etc., without traveling, sometimes long distances to a fire hydrant to cut off the water.

A further object of the invention is to provide a clamp device of the kind mentioned that is simple, light in weight, strong and durable and long lived, one that is easy to use and fast in operation and action on the hose, and one that is not bulky so that it can be easily packed in a kit box of a fire truck, and one that is inexpensive to make and buy.

A still further object of the invention is to provide a device of the kind mentioned which, if desired, may be provided with a holder track for the clamp and having means for yieldably retaining the clamp in the track so that the clamp may be carried on the step or floor of a fire truck instead of being carried in a kit box as above mentioned. These and other objects of the invention will be more fully explained as this description progresses.

Now referring to the accompanying drawings in which similar numerals of reference designate the same parts throughout the several figures of the drawings; Fig. 1 is a perspective view of the device showing the hose clamp in its closed position, and parts being broken away for convenience of illustration.

Fig. 2 is a sectional view through the device, the view being as seen from the line II—II in Fig. 1, and looking in the direction of the arrows.

Fig. 3 is another sectional view through the device, the view being taken substantially along the lines III—III in Fig. 4, looking in the direction of the arrows.

Figure 4:
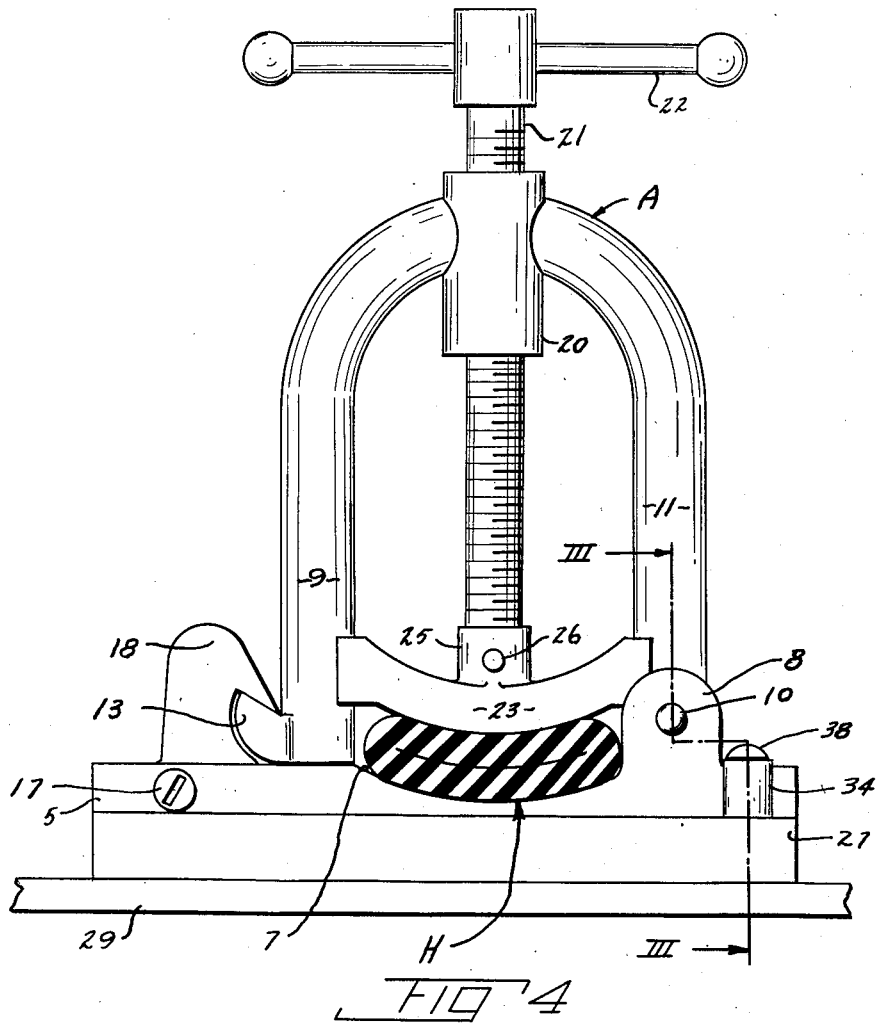
Fig. 4 is a view approximately at a section through the hose immediately to the outer limits of the clamping device and showing the mashing action on the hose.

In the drawings the device is shown as having a channel shaped base member 5, the lower edges of the leg portions having outwardly extending flange portions 6 and 6a to form a rather broad base for the support of the clamp device and to prevent its tipping over when set down.

Integrally formed on the upper side of the web 5a of the channel 5 is a curved concave portion 7 and at one end of which is integrally formed a pair of upwardly extending ears 8 that are spaced apart, and between which is pivotally mounted the lower end of a leg 11 of an inverted U-shaped element A.

A pin 10 is passed through the ears 8 and the lower end of the leg 11 to form the pivotal mounting aforementioned. The pin 10 obviously may be a pin, a rivet or bolt as desired. The other end of the other leg 9 of the U-shaped element A has a depending pin portion 12 integrally formed thereon and also has an outwardly extending and upwardly directed hook portion 13 that is also integrally formed thereon.

The end of the channel 5 opposite from the ears 8 is provided with an elongated well 15 defined in part by the spaced apart sides 14, and by the adjacent end portion of the concave element 7.

In the bottom of the well is located an opening, in which the depending pin portion 12 is slidably received. Between the outer end portions of the walls 14 is positioned a latch hook element 16 that is pivotally mounted on a pin 17 that is passed through the walls 14 and the lower portion of the hook element 16. The hook element 16 is provided with an inwardly directed hook portion 18 that is adapted to be rocked over the hook portion 13 of the leg 11. The lower portion of the hook element 16 is provided with an inwardly extending actuating leg element 19 that is adapted to be engaged by the lower portion of the hook element 13 on the leg 9.

In the center of the curve of the inverted U-shaped element A is integrally formed therewith a sleeve portion 20 that is in parallelism with the legs 9 and 11. The inside of the sleeve portion 20 is threaded and a shaft 21 is threadedly received therein. The upper end of the shaft 21 is provided with a cross bar 22 that is rigidly fixed thereto and by which the shaft 21 may be turned to move the shaft 21 upwardly or downwardly through the sleeve 20.

The device is provided with a clamp bar 23, the lower edge of which is convexly curved and the ends of the clamp bar are fashioned as at 24 to slidably fit partially around their respective leg elements 9 and 11 of the U-shaped element A so that the clamp bar 23 may be moved up and down between the legs 9 and 11. The clamp bar 23 is provided with an upwardly extending socket portion 25 that is integrally formed on the clamp bar 23 and the lower end of the shaft 21 is revolvably seated therein and there retained by a set screw 26 that is threaded through the wall of the socket 25 and the inner end of the screw 26 is received in an annular groove (not shown) in the lower end of the shaft 21 as a means of retaining the lower end of the shaft 21 in the socket 25.

The device is provided with a pair of channel track elements 27 and 28 that are spaced apart and are in opposing positions and are rigidly attached to the step or floor 29 of a fire truck or any other suitable support for the clamp device by means of bolts or screws 30 that slidably pass through holes in the lower leg of each channel track element 27 and 28 and are rigidly attached to or fixed in the supporting element 29. The outwardly turned leg flanges 6 and 6a are slidably receivable in the channels 27 and 28 and the rear end of the flange 6a has an indenture 31 in the upper side thereof to receive the rounded end of a pin 32 that is slidably carried in a bore 33 (see Fig. 3) through the upper leg of the channel 27. The upper leg of the channel 27 has a tubular element 34 as a part thereof and extending upwardly therefrom and whose center vertical axis coincides with that of the bore 33, however the inside diameter of the tubular element 34 is greater than that of the bore 33, therefore an annular shoulder 35 is formed at the top of the bore 33, and a head 36 that is a part of the pin 32 rests on the shoulder 35 and is slidably positioned within the tubular element 34. Also within the tubular element 34 is a helical spring 37 that is under compression between the pin head 36 and the lower end of a screw 38 that is threaded into the upper end of the tubular element 34. This arrangement makes it possible to slip the hose clamp device in and out of the channel holder 27 and 28 and when the device is in the channels 27 and 28 the spring 37 yieldably holds the rounded end of the pin 32 in the depression 31 to prevent the clamp device from jarring or working out of the channel holders 27 and 28 as the fire truck travels down the street.

The operation of the device is as follows: The hook 18 may be rocked outwardly in the direction of the arrow B, whereupon the U-shaped element A may be rocked in the direction of the arrow D at which time the leg 11 will be rocked to one side to form an opening between the lower end of the leg 11 and the concave element 7 through which a fire hose may be passed to rest on the concave element 7. This having been done, the U-shaped element curved portion of the hook 13 will engage the upper curved portion of the hook 18 and rock it in the direction of the arrow B whereupon the hook 13 will pass on by or below the hook 18 and in so doing the lower curved portion of the hook 13 will engage the actuating leg element 19 of the hook element 16 and press the leg element 19 downwardly thereby rocking the element 16 so that the hook 18 passes over the hook 13 to hold the U-shaped element A against any rocking movement in the direction of the arrow D. Simultaneously with this action, the pin 12 enters the hole in the well 15 to provide a stay so that the U-shaped legs 9 and 11 cannot be spread under any pressure that might be imposed upon them. The clamp having thus been closed is ready for clamping action which is accomplished by turning the cross arm 22 to screw the shaft 21 downwardly whereupon the clamp bar 23 will engage the hose H and on continued turning movements of the shaft 21 the clamp bar 23 will be forced downwardly to mash the hose to a flattened position (see Fig. 4) between the concave element 7 and the clamp bar 23 whereupon the flow of water through the hose will be stopped, whereupon any changes in hoses, nozzles or the like may be made.

When it is again desired to have the water flow through the hose, the shaft 21 may be turned to raise the clamp bar 23 whereby water will again be allowed to flow through the hose.

When it is desired to remove the clamp from the hose, the clamp may be opened the same as it was when the clamp was placed on the hose and then be removed therefrom.

While the device as shown and described is probably the preferred form of the device, it is to be understood that such modifications of the device may be employed as lie within the scope of the appended claims without departing from the spirit and intention of the invention. Now having fully shown and described my invention, what I claim is:

1. A hose clamp comprising the combination of a clamp half, a base portion for the said clamp half, a holder for the clamp half and base portion therefor, and a resilient means for holding the base portion on and releasing it from the said holder, said clamp half comprising an inverted U-shaped element having a curved clamp bar slidably carried between the legs of the inverted U-shaped element and being guided thereby, a clamp screw, said clamp screw being threaded through the central portion of the inverted U-shaped element and engaging the said clamp bar for forcible movements thereof along the legs of the inverted U-shaped element, and means for turning the clamp screw, said base element being substantially channel shaped and having outwardly turned lips one along the edge of each channel leg as a part of the means for holding the clamp base in the said holder therefor, the web of the channel having a curved portion integrally formed thereon to match the curve of the clamp bar for clamping action between clamp bar and the curved portion of the base element, one end of one leg of the U-shaped element being hingedly attached to the said base portion of the device and adjacent one end of the curved portion of the base element, a guide and latch means for the free end of the other leg of the inverted U-shaped element, the guide means comprising a pin portion integrally formed on the end of the other leg of the said inverted U-shaped element and projecting axially therefrom, the web of said base channel having a hole therein and said guide pin being receivable in said hole as a means of guiding the pin and leg carrying the pin, a hook portion, said hook portion being integrally formed on the lower end portion of the other leg of the inverted U-shaped element and extending outwardly therefrom in alignment with the two legs of the inverted U-shaped element, said hook having an upwardly directed flat face and a receding curved lower edge portion, a second hook element, said second hook element being hingedly mounted on the said base element with the hook portion thereof opposing and being engageable with and over the first said hook, the second said hook element having a forwardly sloping shank portion beneath the hook portion thereof, said sloping shank portion being engageable by the curved lower edge portion of the first said hook element as the other leg portion of the U-shaped element is rocked into its closed position whereby the second said hook is rocked into latched position over the first said hook, said holder for the device comprising a pair of spaced apart opposing channels having channel legs thereon, said channel being attachable to a supporting element therefor in position to each slidably receive one of the outwardly extending lips on the legs of the said base channel, and said resilient means comprising a spring actuated means carried by one of the holder channel legs and being engageable with a portion of the base element for resiliently holding the clamp device in and releasing it from the holder for the device.

2. In a hose clamp as defined in claim 1; said combination being further characterized by the spring actuated means for the hose clamp device consisting of a tubular element being rigidly carried on one of the channel legs of the holder portion of the device, the last mentioned channel leg having a hole therethrough that is smaller in diameter than the inside diameter of the said tubular element and being concentric therewith and positioned over the base lip slidably carried in the holder channel, a plunger comprising a leg having a head rigidly carried on one end thereof, said plunger head being slidably receivable in the said tubular element, the leg of said plunger being slidably receivable in and passable in and through the said hole in the holder channel leg and the head being engageable on top of the holder channel leg, a spring and a closure element for the upper end of the tubular element and said spring being under compression between the head of the plunger and the closure element for the tubular element, said closure for the upper end of the tubular element being rigidly carried thereon and detachable therefrom, the base lip in the holder channel and beneath the plunger having an indenture therein and in registry with the end of the plunger leg when the clamp base is fully inserted in the channel holders therefor.

References Cited in the file of this patent

UNITED STATES PATENTS

| Number | Name | Date |
|---|---|---|
| 176,887 | Peer | May 2, 1876 |
| 582,027 | Smith | May 4, 1897 |
| 950,111 | Miner | Feb. 22, 1910 |
| 1,100,317 | Masterson | June 16, 1914 |
| 1,337,247 | Maier | Apr. 20, 1920 |
| 1,369,748 | Karro | Feb. 22, 1921 |
| 1,632,036 | Mullen | June 14, 1927 |
| 1,707,221 | Edwards | Apr. 2, 1929 |
| 2,150,262 | Brittain | Mar. 14, 1939 |